(12) United States Patent
Nash (10) Patent No.: US 12,295,359 B1
(45) Date of Patent: *May 13, 2025

(54) INSECT REPELLENT LIGHT ASSEMBLY AND METHOD OF USE

(71) Applicant: George C Nash, Temple, GA (US)

(72) Inventor: George C Nash, Temple, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/776,454

(22) Filed: Jul. 18, 2024

Related U.S. Application Data (60) Provisional application No. 63/514,550, filed on Jul. 19, 2023.

(51) Int. Cl.
| | | |
|---|---|---|
| *A01M 29/00* | (2011.01) | |
| *F21S 8/08* | (2006.01) | |
| *F21S 10/00* | (2006.01) | |
| *F21V 23/04* | (2006.01) | |

(52) U.S. Cl.
CPC ............. *A01M 29/00* (2013.01); *F21S 8/08* (2013.01); *F21S 10/002* (2013.01); *F21V 23/04* (2013.01)

(58) Field of Classification Search
CPC .......... F21S 10/002; F21S 8/08; A01M 29/00; F21V 23/04
See application file for complete search history.

(56) References Cited

U.S. PATENT DOCUMENTS

| | | | | |
|---|---|---|---|---|
| 5,528,049 A * | 6/1996 | Callahan | ................. | A01M 1/02 250/493.1 |
| 6,088,949 A * | 7/2000 | Nicosia | ................. | A01M 1/023 43/132.1 |
| 6,301,194 B1 * | 10/2001 | Cauchy | ................. | A01M 29/18 119/719 |
| 8,327,577 B2 * | 12/2012 | Liang | .................... | A01M 1/106 43/113 |
| 10,588,307 B2 * | 3/2020 | Sandford | .............. | A01M 1/023 |

* cited by examiner

*Primary Examiner* — Christopher E Dunay
(74) *Attorney, Agent, or Firm* — Karen Tang-Wai Sutton (57) ABSTRACT

The present invention is an insect repellent assembly comprising of a light source, a transparent container having a quantity of liquid, typically water, inside the container, and a mount that positions the light source so as to be approximately centered with a surface of the liquid, so that about half the light source is below the surface and the remaining half is above the surface. The amount of liquid is not important, other than it cannot fill the entire container. The container is configured to surround the light source so that light emitted by the light source must pass through the container and in one embodiment the container is disposed as a plurality of containers surrounding the light source. A method of use is also provided.

14 Claims, 12 Drawing Sheets

INSECT REPELLENT LIGHT ASSEMBLY AND METHOD OF USE

CROSS-REFERENCE TO RELATED APPLICATIONS

This application claims priority to U.S. provisional patent application Ser. No. 63/514,550 filed 19 Jul. 2023, all of which are hereby incorporated by this reference.

STATEMENT REGARDING FEDERALLY SPONSORED RESEARCH OR DEVELOPMENT

NA

NAMES OF THE PARTIES TO A JOINT RESEARCH AGREEMENT

NA

INCORPORATION BY REFERENCE OF MATERIAL SUBMITTED ON A COMPACT DISC OR AS A TEXT FILE VIA THE EFS WEB SYSTEM

NA

STATEMENT REGARDING PRIOR DISCLOSURES BY THE INVENTOR OR A JOINT INVENTOR

NA

BACKGROUND OF THE INVENTION

Field of the Invention

The invention pertains to the field of insect repellents, specifically, a light assembly that repels insects with eyes, without killing or otherwise injuring them.

Background Art

Many people enjoy camping, barbequing and other outdoor recreational activities, but while engaging in those activities, insects often become a nuisance. Mosquitos and other biting flies make twilight dinners on the patio miserable, so do houseflies hovering over the picnic blanket. Moths, while typically harmless, are attracted to light and can rush inside inside a lit house when the front door is opened to greet a dinner guest.

Many inventions exist to repel insects. It is well known that insects are attracted to light and a common solution is to use electric devices known as bug zappers that use a light to lure the pesky insect in and electrocute it. While this might work well indoors in a bedroom, this sort of solution outside particularly at a campsite in a rural area is not practical due to the large number of insects, and sometimes very large insects or a large number of insects can cause the unit to short out or catch fire. There are also many people who are also turned off by the scorched smell of electrocuted insects. Still others worry about the needless killing of insects, particularly since many animals such as birds, frogs, and bats eat insects and thus the bug zappers are effectively decreasing food sources for these animals. The other main issue with these electric devices is that by using light, they attract more insects to one's campsite and since not all insects will end up in the zapper, they tend to make a nuisance of themselves by pestering campers, their food and of course by biting them. Hence, the solution to annoying insects often creates more problems. As for the other types of repellents, few enjoy using chemicals on their skin, and popular aromatics such as citronella candles, have varying and often limited efficacy. Some work better for certain types of insects while failing to repel others, and often air conditions are also important. Even slightly windy conditions often render aromatics and even chemical repellents useless based on wind directionality.

What is needed is an insect repellent that works universally with all insects that have eyes. What is also needed is an insect repellent independent of weather and air conditions. What is also needed is an insect repellent that is safe for humans and other animals, including the insects themselves to decrease needless loss of life.

DISCLOSURE OF INVENTION

An insect repellent light assembly having a light source emitting a plurality of light rays surrounded by a container made of a transparent material, a quantity of liquid, typically water, inside the container, and a mount that positions the light source so as to be approximately centered with a surface of the quantity of liquid, such that approximately half of the plurality of light rays emitted by the light source are below the surface of the quantity of liquid and the remaining half of the plurality of light rays are above the surface.

BRIEF DESCRIPTION OF THE DRAWINGS

The features and advantages of the invention will become apparent from a consideration of the subsequent detailed description presented in connection with accompanying drawings, in which.

DETAILED DESCRIPTION

Figure 1:
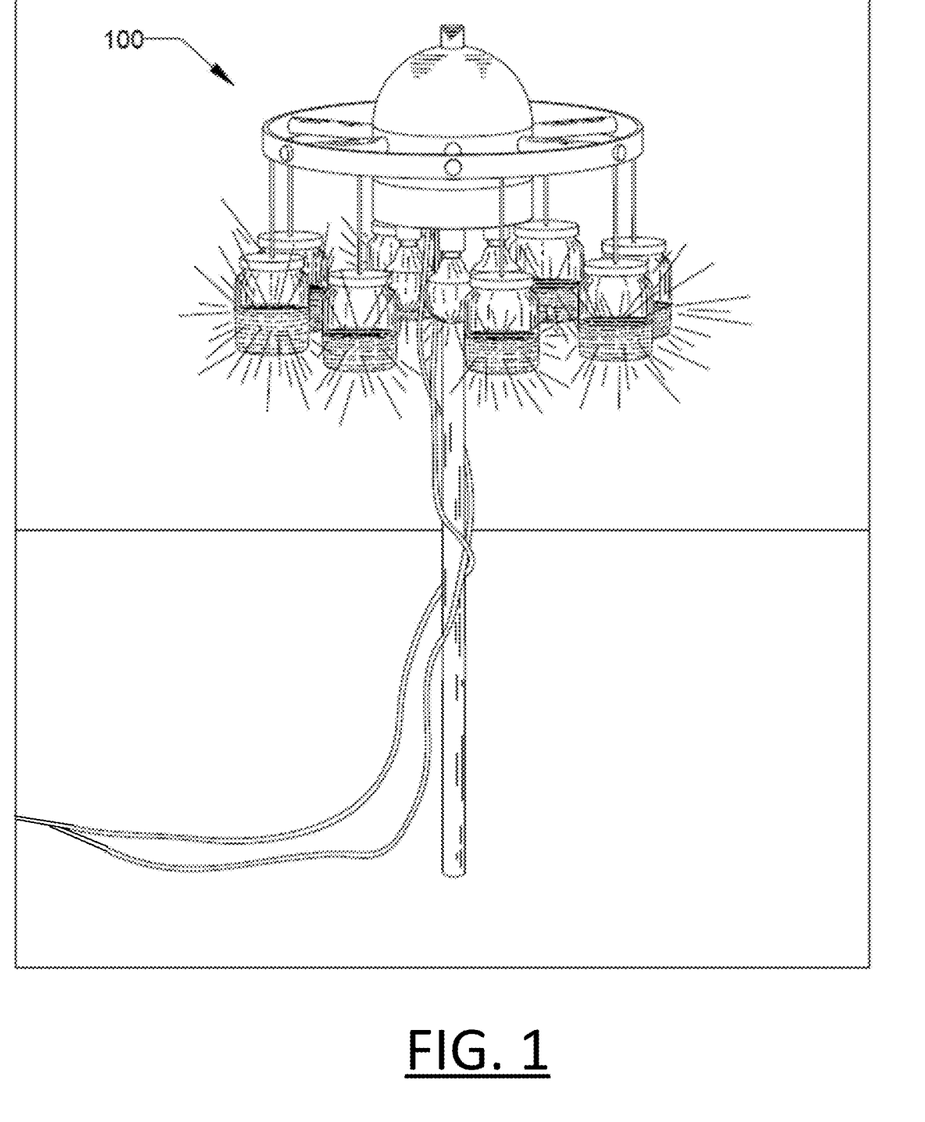
FIGS. 1-12 are a variety of side, top and diagrammatic views of an insect repellent light assembly according to the invention.
Figure 2:
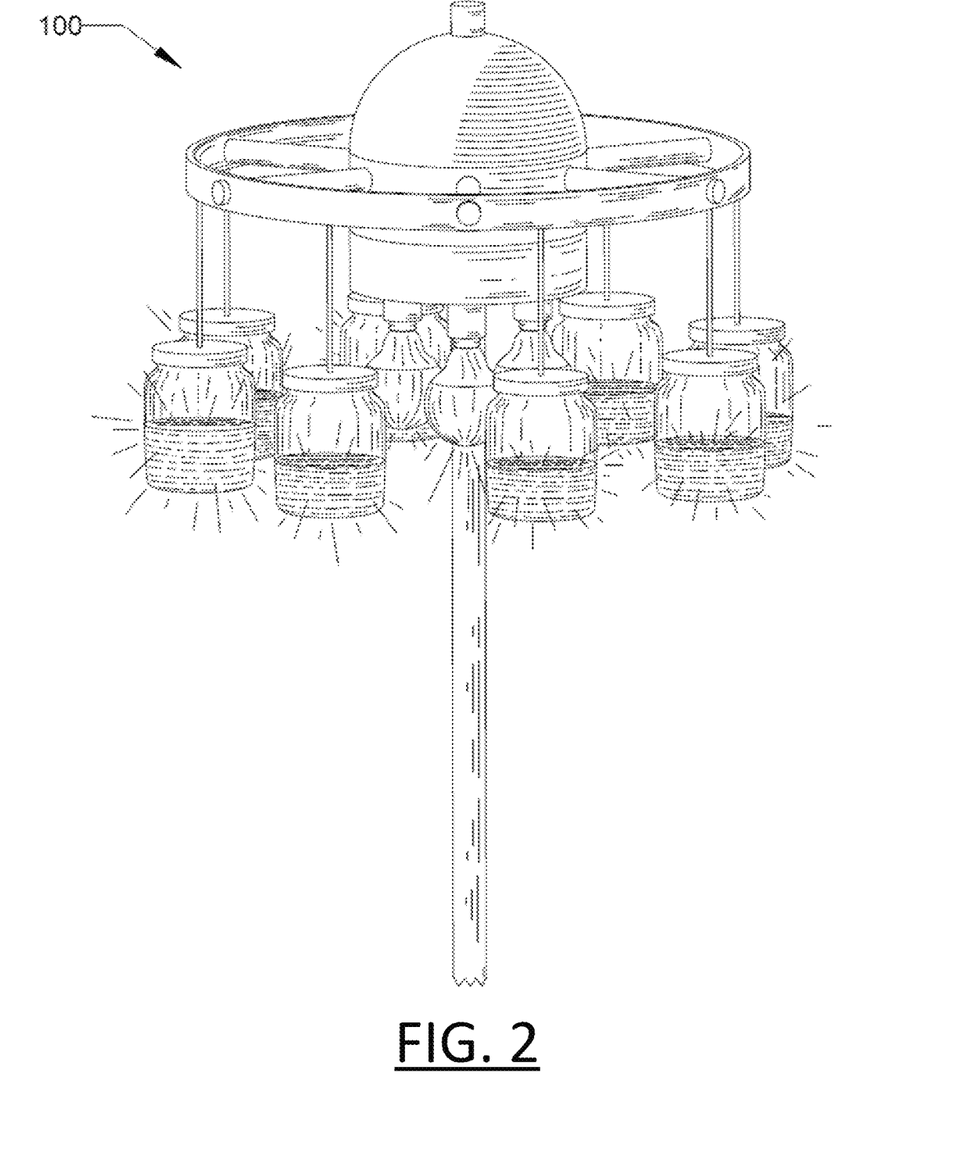
Figure 3:
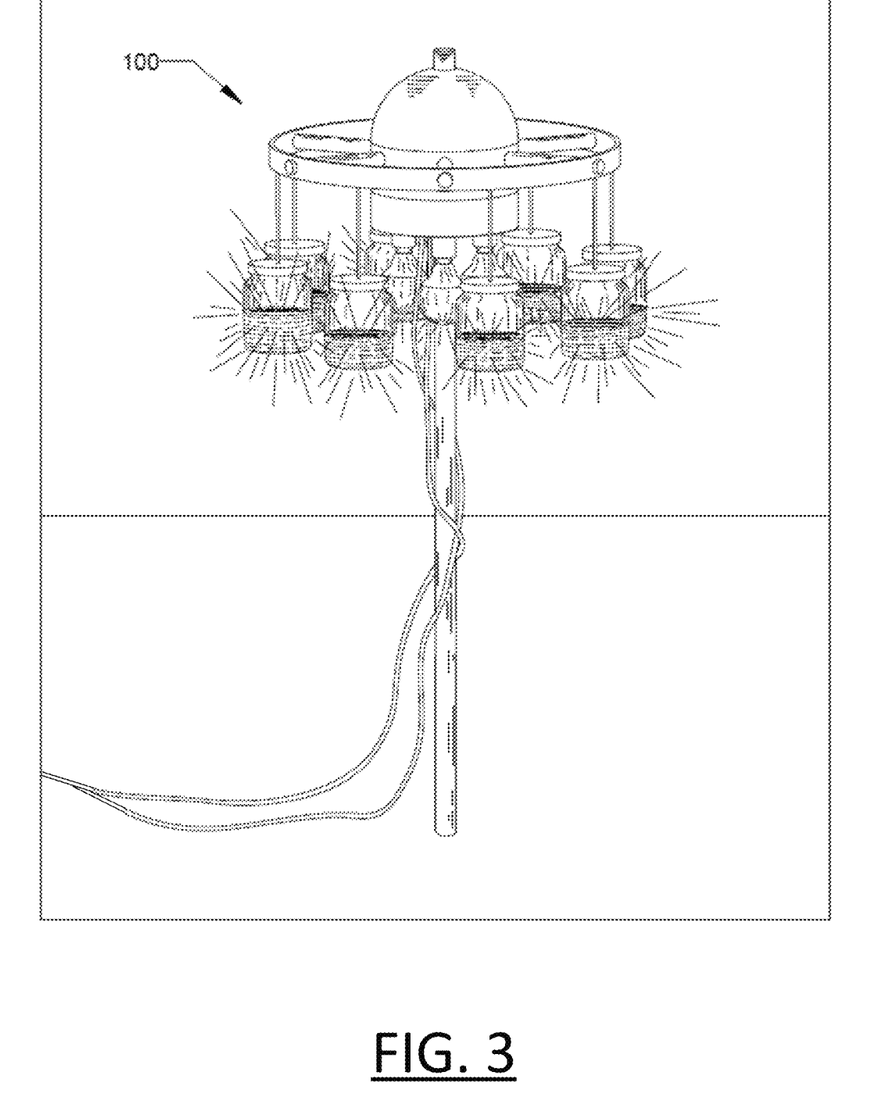
Figure 4:
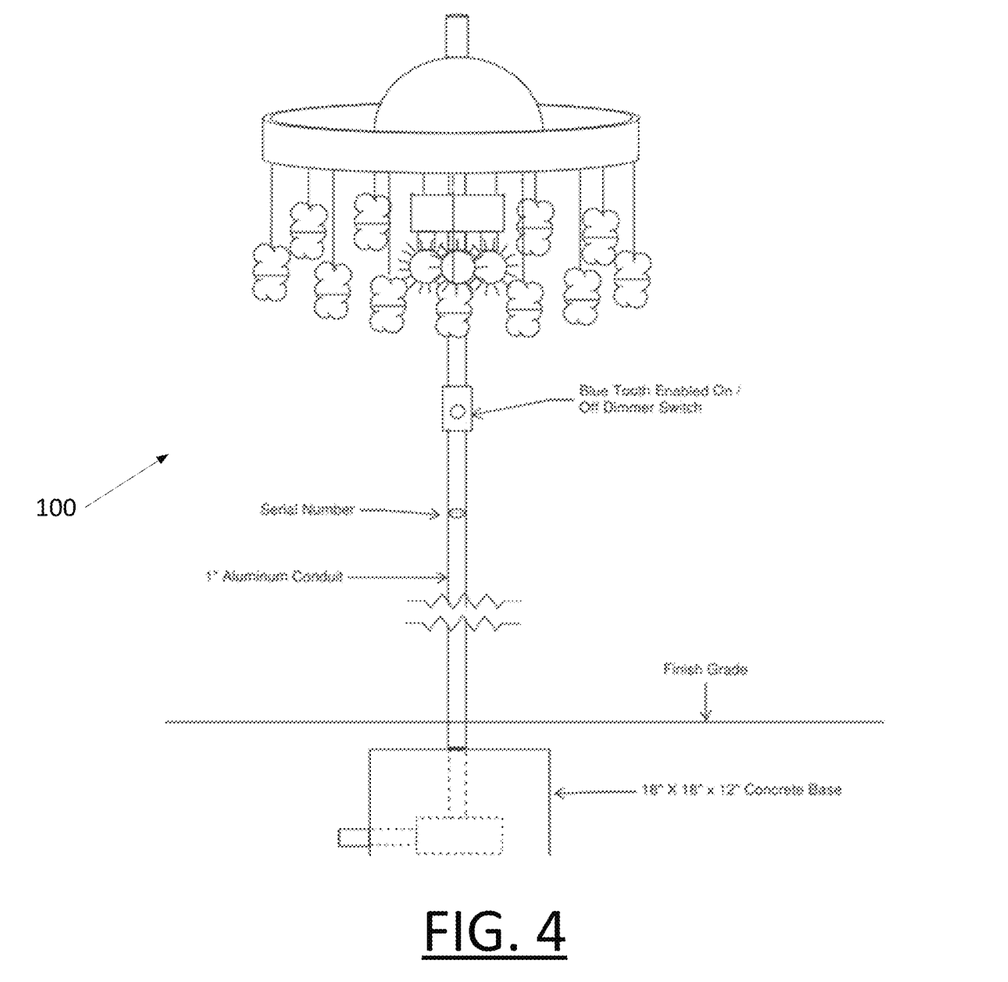
Figure 5:
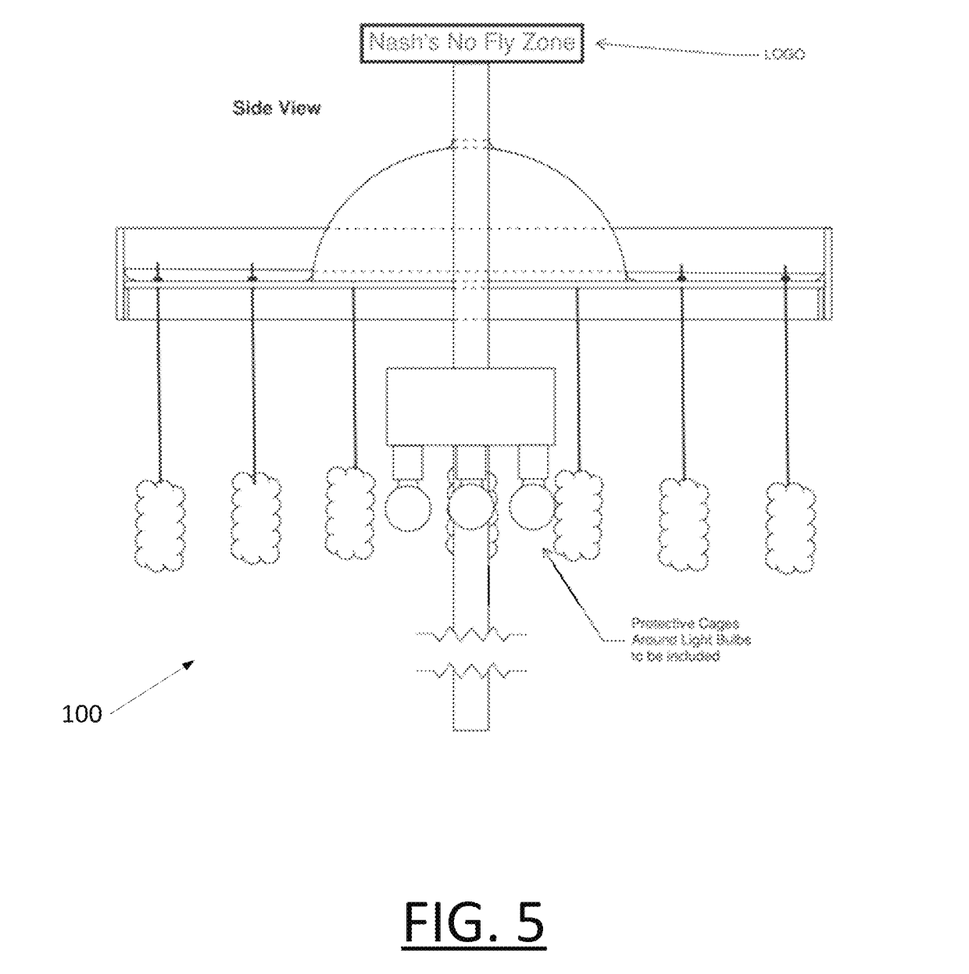
Figure 6:
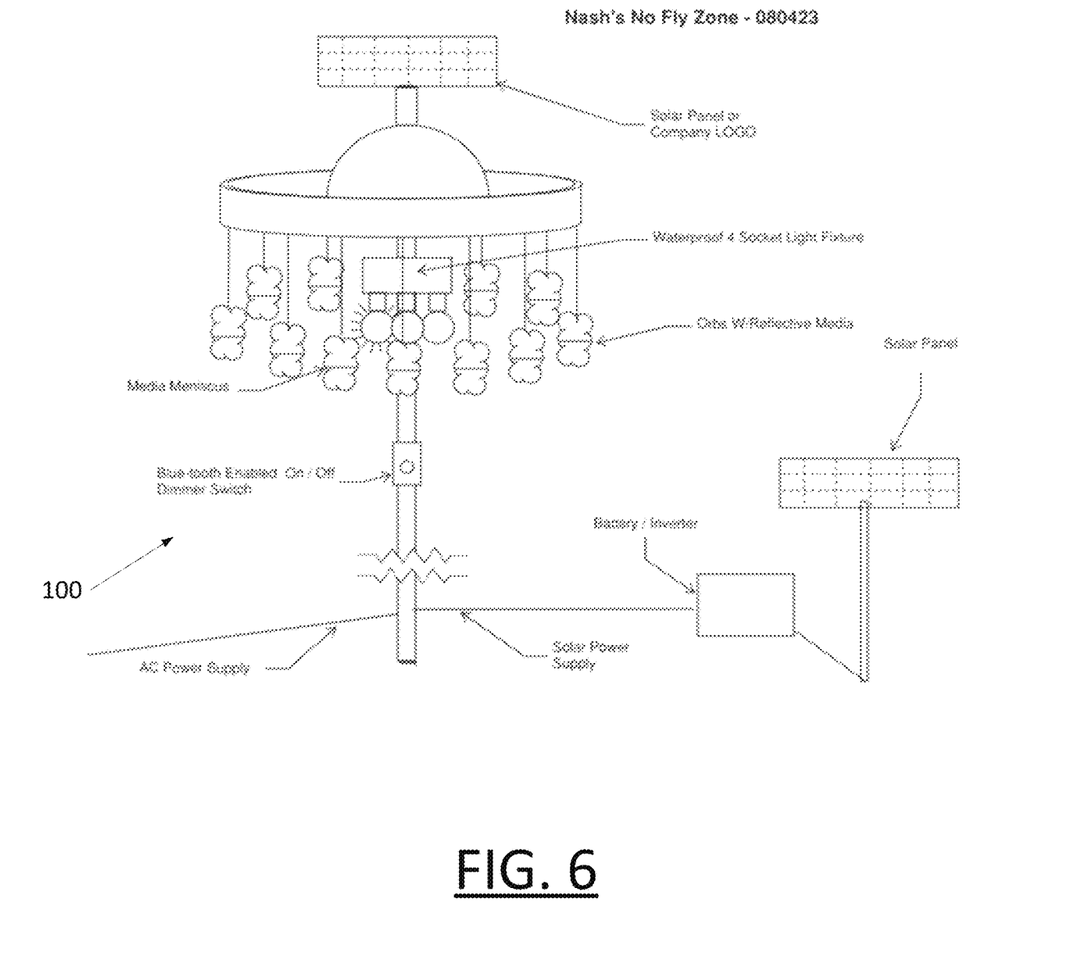
Figure 7:
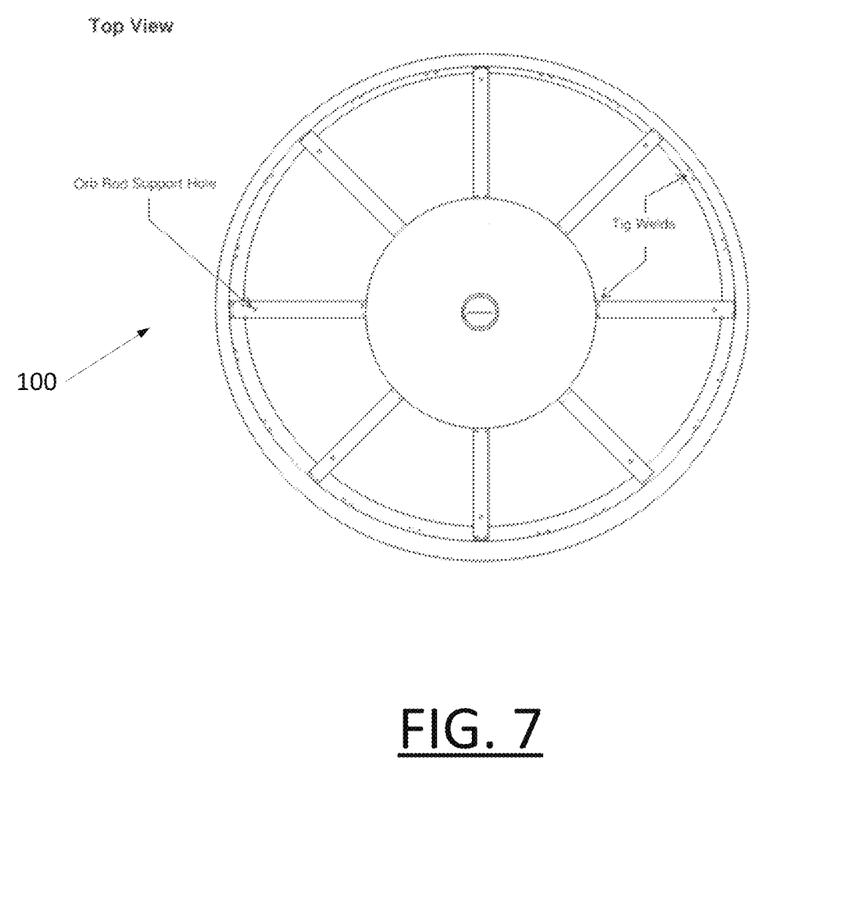
Figure 8:
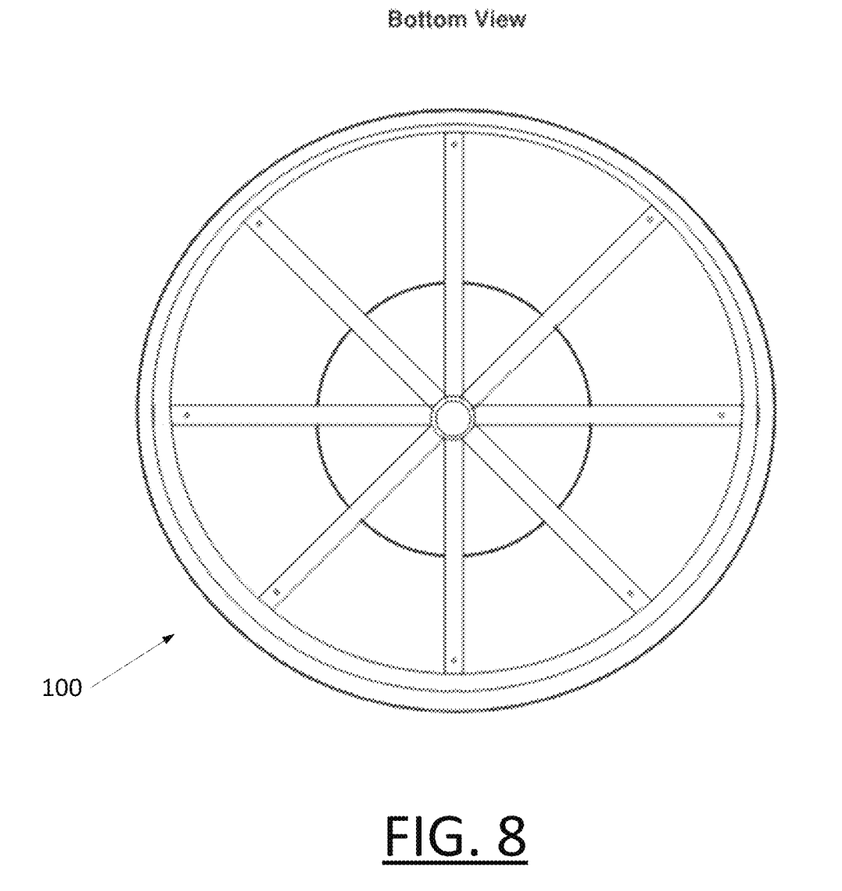
Figure 9:
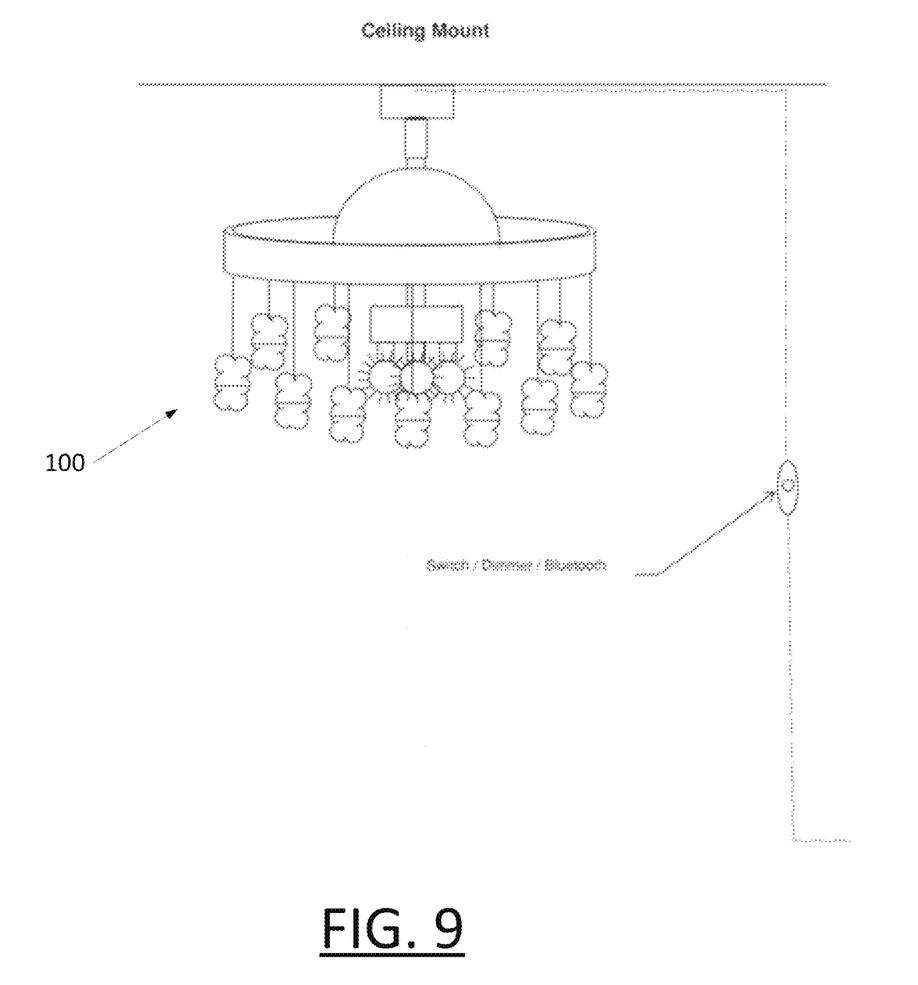
Figure 10:
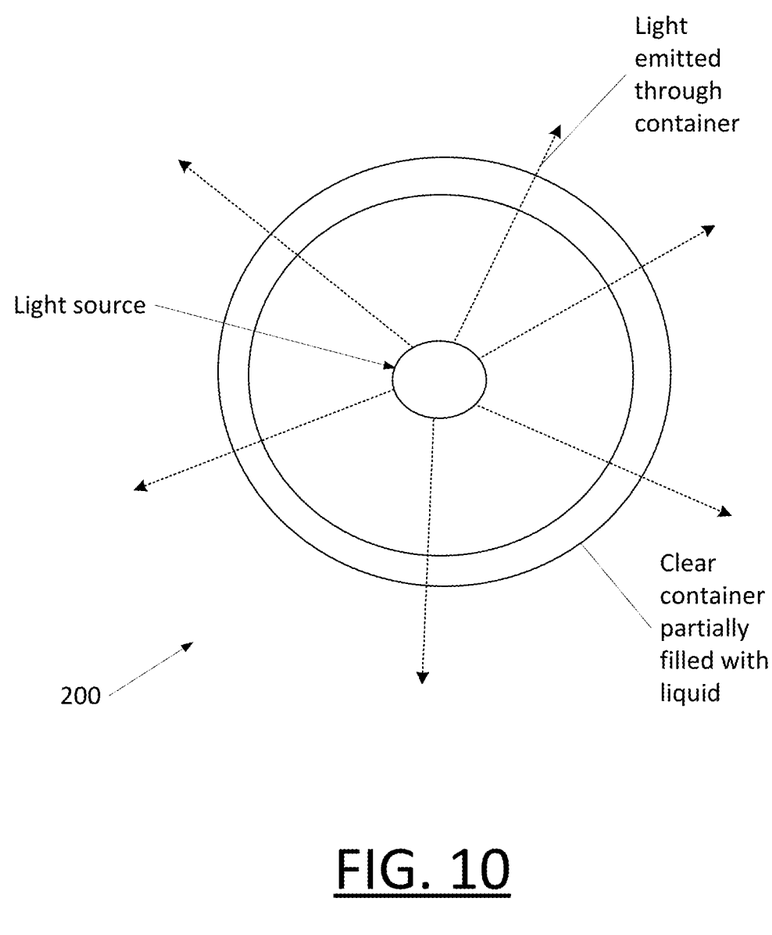
Figure 11:
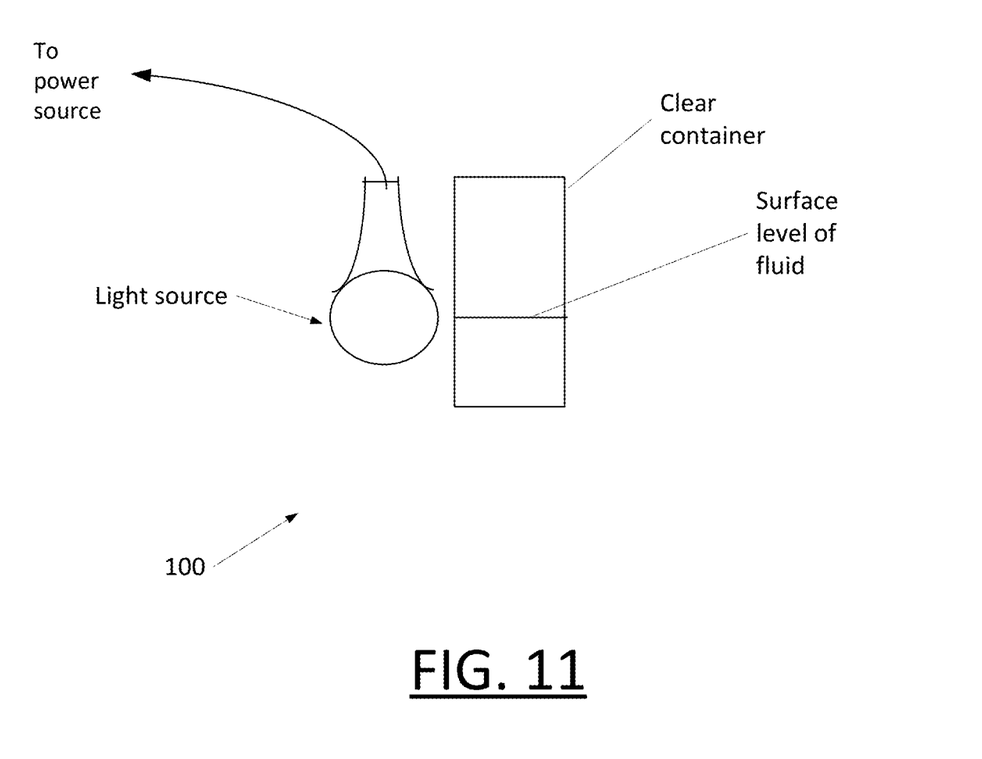
Figure 12:
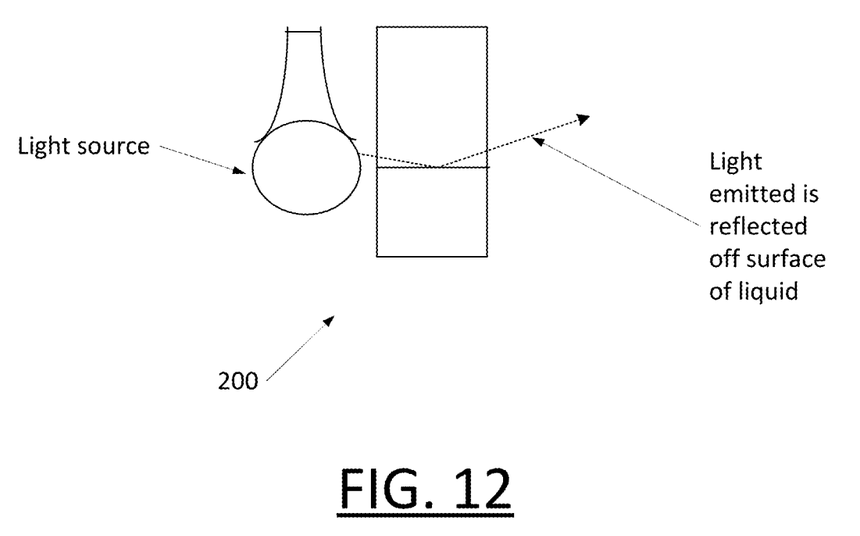

An insect repellent light assembly according to the invention or assembly 100 and a method of using the assembly or method 200 is shown in FIGS. 1-12. Turning to the FIGS., the assembly is comprised of a light source, a clear container having a quantity of liquid, typically water, inside the container, and a mount that positions the light source so as to be approximately centered with a surface of the liquid, so that about half the light source is below the surface and the remaining half is above the surface. In the FIGS., the clear container is disposed as a plurality of clear containers around the light source, but it can also be disposed as a torus or donut-shaped container with a central hole inside which the light source sits. The amount of liquid inside the container is not important, other than it cannot fill the entire container. The inventor believes that other useful liquids can include mineral oil, and combinations of water and other liquids such as antifreeze, oil etc. to prevent freezing or minimize evaporation to allow the assembly to be used in temperate climates where freezing temperatures are a concern. The container can be clear plastic, glass or other material that is transparent. The light source can be any light source including incandescent, fluorescent, LED, and halogen sources, but the inventor believes that the light source ideally has white or daylight wavelengths however other colors including yellow may also be useful.

When light is emitted from the light source, the wavelengths of light hit the surface of the liquid and are redirected. The redirected light causes glare, which is uncomfortable to insects and thus repels them. The inventor notes that only insects with eyes are repelled and that there are some types of insects at various developmental stages which do not have eyes that are not repelled by the light. The inventor notes that his assembly works on all insects with eyes, including stinging and biting insects. All the insects in a certain area can be repelled by positioning one or more assemblies about 30 to 70 feet apart. The assembly is very bright to human eyes as well, however so long as the human does not stare directly at the assembly, the light otherwise acts as any other light and does not otherwise cause discomfort. There is no harm to the human eye however even if staring directly at the light; there is a significant amount of glare, but no damage will occur to the human eye so the assembly is safe to use around people. The assembly also works during the daytime, where the abundance of natural light has no effect on the assembly, which continues to repel insects.

The inventor notes his assembly thus has at least two functions, one as a useful light source and a second as an insect repellent, reducing the equipment needed to transport. The inventor also notes that the containers used could be permanently sealed or designed to allow a user to empty or fill them, as needed, to reduce weight as well as reduce the possibility of cracking due to freezing.

The inventor notes that his assembly can be modified for use not just as a temporary light source but rather can be modified to be used as installed outdoor lighting fixtures. For instance, an existing light fixture could be fitted with a container cover having a sufficient amount of liquid to ensure the position of the light source is optimized to create glare, and the ability to adjust the level of the surface of the liquid in the container.

The light source requires a power source that can include battery and solar power as well as conventional electric sources. Ideally, the light source is also dimmable, to allow the user the ability to control the brightness of the light source. Typically, this will involve a rheostat however other ways of controlling the intensity of the light source can also be included but it not necessary for the function of the assembly.

The inventor notes that in the prior art some people hang bags of water, with or without pennies in them, as insect repellents, however it is controversial as to whether this actually works. The inventor notes that these bags of water are used with natural light, and hence are useless at night, and the idea behind the bags is that light passing through the bags of water causes refraction, changing the speed of the light and thus confusing the compound eyes of the insects. The inventor's assembly is different in that the surface of the liquid and the position of the light source are critical to the operation of the assembly, whereas the bags of water do not rely on the surface of the water but primarily focus on the light refraction by passing light through the water itself. If the light source is positioned too high or too low relative to the surface of the liquid, the assembly does not repel insects.

It is to be understood that the above-described arrangements are only illustrative of the application of the principles of the present invention. Numerous modifications and alternative arrangements may be devised by those skilled in the art without departing from the scope of the present invention.

I claim:

1. An insect repellent assembly, comprising:
   a light source having a light emitting portion;
   a transparent container having a wall surrounding the light source;
   wherein the container has a liquid holding cavity having a total volume capacity;
   wherein the light source is positioned outside the wall and outside the liquid holding cavity;
   a quantity of liquid inside the liquid holding cavity of the container, the quantity of liquid having a surface;
   wherein the quantity of liquid is less than the total volume capacity of the container;
   a mount attached to the light source; and
   wherein the mount positions the light source approximately centered with the surface so that about half of the light emitting portion of the light source is positioned below the surface and a remaining half of the light emitting portion is positioned above the surface.

2. The insect repellent assembly in claim 1, wherein the quantity of liquid is further comprised of water.

3. The insect repellent assembly in claim 1, wherein the quantity of liquid is further comprised of oil.

4. The insect repellent assembly in claim 1, wherein the quantity of liquid in the cavity is at least half of the total volume capacity of the container.

5. The insect repellent assembly in claim 1, wherein the cavity is approximately torus shaped, with the light source positioned in a center of the torus.

6. The insect repellent assembly in claim 1, wherein the container is made of a transparent material.

7. The insect repellent assembly in claim 1, wherein the light emitting portion of the light source emits either white or daylight wavelengths of light.

8. The insect repellent assembly in claim 1, wherein the light source is selected from the group consisting of incandescent, fluorescent, LED, and halogen.

9. The insect repellent assembly in claim 1, wherein the light emitting portion of the light source is dimmable.

10. The insect repellent assembly in claim 1, further comprising a rheostat communicating with the light source.

11. The insect repellent assembly in claim 1, wherein the container is further comprised of a plurality of containers surrounding the light source.

12. A method of using an insect repellent assembly having a light source, a transparent liquid-holding container, a quantity of liquid less than a total volume of the container, and a power source, the method comprising the steps of:
    positioning the insect repellent assembly at a desired location;
    adjusting either the quantity of liquid in the container or the position of the light source such that the light source is positioned such that a light emitting portion of the light source emits approximately half of its light above a surface of the quantity of liquid; and
    powering up the insect repellent assembly.

13. The method in claim 12, wherein the quantity of liquid in the container is a fixed volume of liquid.

14. The method in claim 12, wherein the light source emits at least one of white or daylight wavelengths.

* * * * *